United States Patent

[11] 3,589,104

| | | |
|---|---|---|
| [72] | Inventor | John E. Panzarella |
| | | Lake Jackson, Tex. |
| [21] | Appl. No. | 836,913 |
| [22] | Filed | June 26, 1969 |
| [45] | Patented | June 29, 1971 |
| [73] | Assignee | The Dow Chemical Co. |
| | | Midland, Mich. |

[54] RECOVERY OF CHEMICALS FROM OFF-GASES
10 Claims, 1 Drawing Fig.

[52] U.S. Cl............................................. 55/32, 55/240
[51] Int. Cl.................................................. B01d 19/00
[50] Field of Search........................................... 55/32, 42, 89, 90, 228, 240

[56] References Cited
UNITED STATES PATENTS
RE 24,433  2/1958  Lavery....................... 55/32 X
3,347,019  10/1967  Barnhart..................... 55/32

Primary Examiner—Samih N. Zaharna
Assistant Examiner—R. W. Burks
Attorneys—Griswold and Burdick, J. Roger Lochhead and Glywynn R. Baker ABSTRACT: An improved method for the recovery of valuable organic compounds and deleterious air polluting chemicals from water-containing process off-gases which comprises (1) contacting the process off-gases with a cold surface upon which a film of water-miscible liquid is maintained; (2) separating the noncondensible gases from the condensate which forms upon contact of the off-gases with the cold wall and the water-miscible liquid; (3) separating the water-miscible liquid, water and condensate one from the other; (4) returning the water-miscible liquid to the first step to form the film on the cold wall and (5) recovering the condensates free of the water-miscible liquid and water.

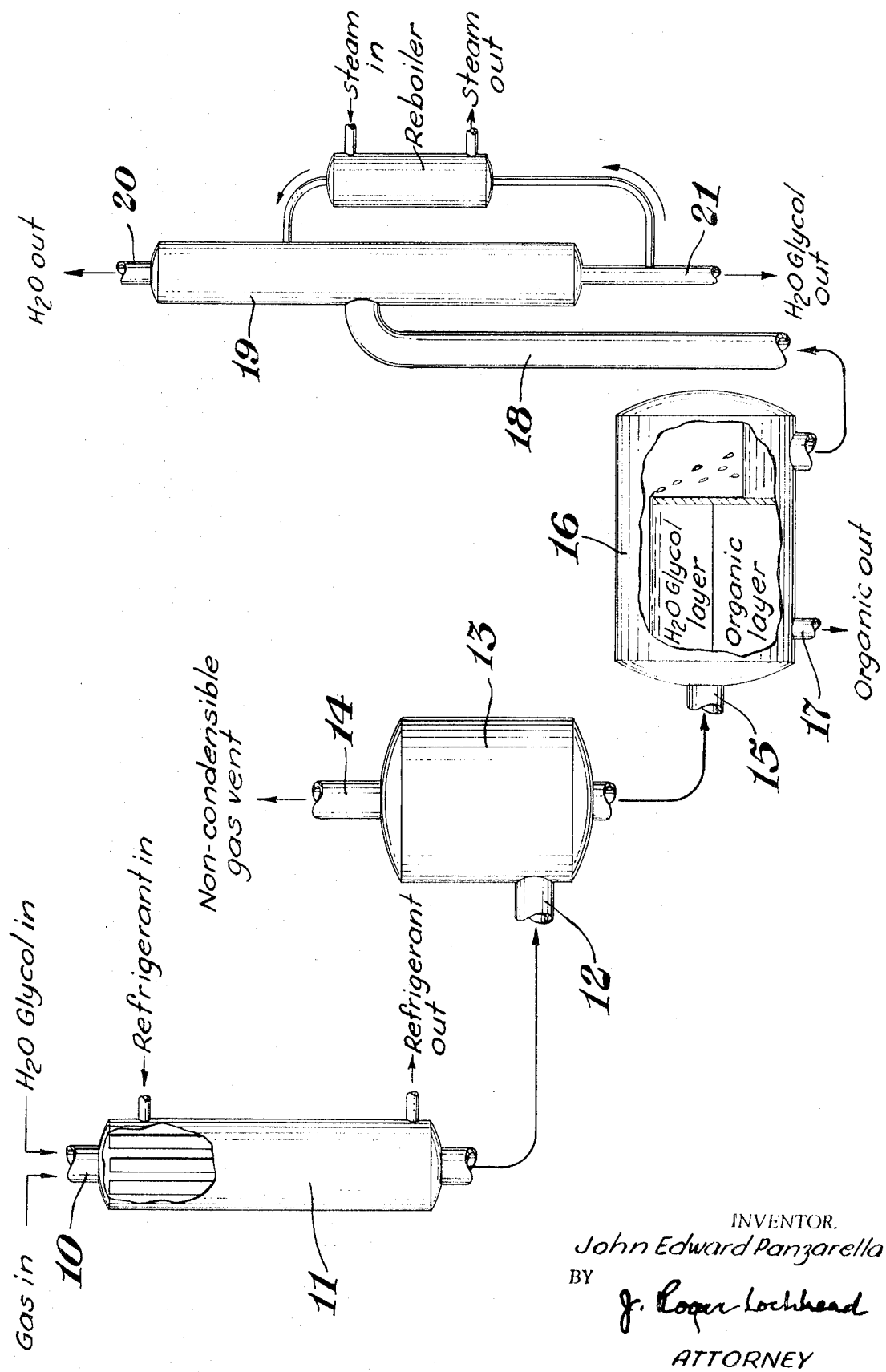

RECOVERY OF CHEMICALS FROM OFF-GASES

BACKGROUND OF INVENTION

The chemical process industry has for years sought procedures for recovering valuable chemicals and deleterious air-polluting chemicals from off-gases, vent gases and waste gases produced during the manufacture of chemical compounds. The more common expedients employed are carbon adsorption and compression-decompression with or without cooling. These processes are expensive and require large facilities and when cooling is employed and water is present, equipment blockage due to solids formation is common. With the continued construction of plants whose off-gas volumes are astronomical in volumes, the loss of 20 to 50 percent of the valuable products in such off-gases can no longer be tolerated. Further, the enormous quantities of photoreactive chemicals which are so often found in off-gases can no longer be permitted to pollute the atmosphere. The present-day techniques are not adequate, or are prohibitive in capital expenditure and operation, to handle the amounts of valuable or deleterious chemicals being released.

Therefore, it is an object of the present invention to provide a process for treating off-gases and the like to recover upwards of 90 percent of the valuable chemicals, as well as remove deleterious chemicals, from off-gases.

A further object of the present invention is to provide a process in which water condensed within the system does not freeze, causing blockage of the system.

BRIEF DESCRIPTION OF INVENTION

In accordance with the present invention a chemical process off-gas which contains noncondensable gases and vapors of condensable chemicals, as well as water vapor, is introduced into a zone which is maintained at a temperature below the condensation temperature of the condensable chemicals to be removed. The zone into which the off-gases are introduced is provided with a film on its walls of a water-miscible liquid which remains liquid at the operating temperature of the zone and which is preferably condensate nonmiscible. The condensate (e.g. the condensed vapors of the condensable chemicals, the water-miscible liquid and the water condensed from the off-gases) is separated from the noncondensable gases after leaving the zone. The noncondensable gases are vented to the atmosphere. The water and water-miscible liquid are separated from the condensate. The water-miscible liquid is then concentrated by removal of water, as in a still, and the concentrate returned to the zone to establish and maintain the film. The remainder of the condensate, containing the valuable chemicals and the pollutants, is then collected.

Suitable water-miscible liquids for establishing and maintaining the film in accordance with the present invention are those organic chemicals which, under the operating conditions, are miscible with water, remain liquid throughout the gas condensation step, are separable from the water, and, preferably, are not miscible with the organic condensables. Representative classes of such liquids are the $C_2$ and $C_3$ glycols, the $C_1$ to $C_4$ alcohols, the $C_2$ and $C_3$ glycol ethers of lower alcohols, and the like, such as ethylene glycol, diethylene glycol, triethylene glycol, propylene glycol, dipropylene glycol, tripropylene glycol, methanol, ethanol, propanol, methoxy ethanol, ethoxy ethanol, propoxy ethanol and the like. Other organic chemical compounds which lower the freezing point of water may be employed if they are immiscible, or substantially immiscible, with the condensable chemicals, and which remains liquid at the operating temperature, generally well below zero and oftentimes as low as $-60°$ C. It is to be noted that in some situations, aqueous solutions of the water-miscible liquids are suitable for application herein. The preferred class of water-miscible liquids is the $C_2$ glycols, such as ethylene glycol and diethylene glycol, particularly when employed as 40 to 80 weight percent aqueous solutions.

Off-gases from numerous chemical processes which contain large quantities of noncondensable gases (such as air, nitrogen, carbon monoxide, carbon dioxide and oxygen) as well as water, and valuable and/or deleterious condensable organic compound vapors, may be processed. Thus, one can recover the chlorinated products, reactants and byproducts in an off-gas from an oxychlorination process. Representative of the chlorinated products, reactants and byproducts of such a process are ethylene dichloride, ethyl chloride, cis- and trans-dichloroethylene, trichloroethylene, perchloroethylene symmetrical and unsymmetrical tetrachloroethane, vinyl chloride, vinylidene chloride, carbon tetrachloride, methylene chloride and chloroform. Similarly one can recover valuable reactants, products and byproducts and/or pollutants, from other processes which, by virtue of the use of air, $CO_2$, $N_2$, oxygen or water, produce off-gases which contain water. Representative of such processes are direct or indirect fired driers, waste burners and the like which produce exhaust gases which contain either valuable or deleterious chemicals in addition to water vapor, it being desirable to recover said chemicals.

The operating conditions are not critical. However, in order to be economical, the process is generally used only when the temperature of the zone is maintained below 0° centigrade. The pressure is not critical and the process operates equally well at atmospheric, subatmospheric and superatmospheric pressures, although operating under a high vacuum or a high pressure increases the cost of operating and the capital expenditures.

DETAILED DESCRIPTION OF INVENTION

The drawing illustrates one method for carrying out the process of the invention.

Off-gas and an ethylene glycol-$H_2O$ mixture are led through a conduit 10 into the top of the cooling zone 11. The liquid mixture is dispersed at the top of the zone 11 so that it covers the interior walls of said zone.

The liquid-gas mixture is then removed from the zone 11 by way of a conduit 12, and led into a gas-liquid separator 13. The gases so separated are vented to the atmosphere via a conduit 14, and the liquids removed via a conduit 15 to a separator 16 which removes the condensed organics, which exit via a conduit 17. It is to be noted that if a water-miscible liquid is used which is miscible with the condensate as well, one or more stills would be required in the place of the phase-separator 16. The glycol-$H_2O$ mixture, now diluted over that introduced into zone 11, is removed by a conduit 18 to a concentrator 19, wherein sufficient $H_2O$ is removed to raise the glycol concentration to the desired level. The excess $H_2O$ is removed via a conduit 20, and the concentrated glycol-$H_2O$ is removed via a conduit 21.

It is to be understood that the process may be run in a countercurrent fashion with equal, and often increased efficiency.

SPECIFIC EMBODIMENTS

Example 1

A vertical tube and shell condenser was utilized for the experiment. Liquid ammonia ($-41°$ C.) was the coolant in the shell.

The feed gas was 87.95 volume percent $N_2$, 3.18 volume percent $H_2O$ and 8.87 volume percent chlorinated hydrocarbons. The hydrocarbons were primarily ethylene dichloride and smaller amounts of ethyl chloride, cis- and trans-dichloroethylene and $\beta$-trichloroethane.

The feed gas (38° C.) entered the tube side of the condenser at a flow rate of 614 SCF/hour and a pressure of 7.8 p.s.i.g. Expansion into the system dropped the pressure to 0.26 p.s.i.g. A 60 weight percent aqueous solution of ethylene glycol, at a rate of 6.56 lb./hour and a temperature of $-28°$ C., was also fed into the tube so that it flowed down and covered the walls of the tube. The gas and glycol flow was concurrent.

The gas, at $-21°$ C., exited the condenser at 545 SCF/hour, and contained 0.576 volume percent chlorinated hydrocarbons. The exiting glycol solution, separated from the condensate by phase separation, contained 52 weight percent glycol due to $H_2O$ dilution from the feed gas. Only 400 p.p.m. glycol was detected in the recovered chlorinated hydrocarbons.

Example 2

Utilizing the same condenser as in Example 1, a gas (91.33 volume percent $N_2$, 1.71 volume percent $H_2O$ and 6.96 volume percent chlorinated hydrocarbons), at a temperature of 33° C. was fed into the condenser tube at 504 SCF/hour and a pressure of 7.2 p.s.i.g. Expansion into the system dropped the pressure to 0.164 p.s.i.g. A 65 weight percent aqueous solution of ethylene glycol (−29° C.), at a rate of 6.60 lb./hour, entered the tube as before.

The gas, at −22° C., exited the condenser at 473 SCF/hour and contained 0.49 volume percent chlorinated hydrocarbons.

I claim:

1. In a process for recovering valuable organic compounds and/or deleterious air-polluting chemicals from hot noncondensable gases containing the condensable organic chemicals and/or pollutants and water vapor, wherein the hot gases are cooled to below the condensation point of the condensable gases by contacting with a cold surface, the improvement which comprises:
    A. establishing a film on a cold surface with a water-miscible organic liquid;
    B. contacting said hot gases with the cold surface upon which there is maintained the film;
    C. condensing the condensable gases and water on said surface;
    D. venting the noncondensable gases to the atmosphere; and
    E. separating the water and miscible organic liquid from the condensed gases.

2. The process of claim 1 wherein the miscible organic liquid is concentrated and returned to step A to form the film.

3. The process of claim 1 wherein the water-miscible liquid is also immiscible with the condensable gases.

4. The process of claim 1 wherein the recovered organic compounds are $C_1$ to $C_4$ chlorinated hydrocarbons.

5. The process of claim 4 wherein said chlorinated hydrocarbons are recovered from an oxychlorination reactor off-gas.

6. The method of claim 1 wherein the miscible organic liquid is a $C_2$ or $C_3$ glycol.

7. The method of claim 6 wherein the glycol is ethylene glycol.

8. The method of claim 1 wherein the miscible organic liquid is a mixture of 40 to 80 weight percent of ethylene glycol and 60 to 20 weight percent of $H_2O$.

9. The process of claim 4 wherein the miscible organic liquid is ethylene glycol, diethylene glycol, triethylene glycol, propylene glycol, dipropylene glycol, tripropylene glycol, methanol, ethanol, propanol, methoxy ethanol, ethoxy ethanol or propoxy ethanol.

10. The process of claim 9 wherein the hot gases are cooled to between 0° and −60° C.